United States Patent Office 2,776,911
Patented Jan. 8, 1957

2,776,911

PROCESS OF COATING PAPER WITH GELLABLE WATER SOLUBLE SALT OF CELLULOSE SULFATE AND PIGMENT AND GELLING SAID COATING

George P. Gregory, Elsmere, Del., assignor to Hercules Powder Company, Wilmington, Del., a corporation of Delaware No Drawing. Application April 30, 1952,
Serial No. 285,326

7 Claims. (Cl. 117—62)

This invention relates to a coated paper and processes for the preparation thereof.

In the conventional process for the preparation of a coated paper there is first prepared a mixture of water and a pigment such as clay or the like, optionally together with other materials such as, for example, a soluble pyrophosphate which may act as a dispersing and stabilizing agent. This mixture, otherwise known as a pigment slip or, since it generally contains clay, as a clay slip, is then compounded with a binder to produce a composition known in the art as a coating color. The coating color is applied to a cellulose web which is dried to give the coated paper.

Considerable amounts of the binder are used and accordingly the composition and characteristics of the binder are of great importance in determining the qualities of the finished paper. Important properties of the binder are that it must impart to the coated paper a high degree of brightness, smoothness and gloss and a good finish and feel after calendering. In addition to these basic qualities required in coatings, there are various other characteristics that go far in determining the value and utility of coating binders. (1) The coating color must flow smoothly and evenly so that it may be applied to paper at sufficiently high speeds to be economical in ordinary coating processes; (2) the coating must have high strength to permit subsequent printing on the coated paper without "picking" and (3) the coating must have a high wet-rub resistance for uses wherein the coated paper is treated with water as, for example, in offset printing.

It has previously been difficult to find a satisfactory adhesive or binder which is favorably adapted for these critical needs and at the same time is economically available. A recent patent, U. S. 2,502,783 to Donald Robert Erickson, teaches a new process using a cellulose derivative as the binder in a paper coating. This patent shows the use of alkali-soluble hydroxy-alkyl cellulose, specifically hydroxyethyl cellulose, as an adhesive, for binding pigmented coatings to paper, together with a novel process for applying the coatings to paper. This process consists of preparing a coating color of an alkaline dispersion of the hydroxyethyl cellulose and coating pigment, applying the mixture to paper, and immediately contacting the coated surface with a setting agent to neutralize the alkali and precipitate or gel the alkali-soluble, water-insoluble hydroxyethyl cellulose. The excess setting agent is squeezed out and the coated sheet is dried.

The use of hydroxyethyl cellulose as a paper coating adhesive has not been commercially accepted. One of the reasons for this lack of commercial acceptance is the fact that it is essential at all times to use a setting agent with hydroxyethyl cellulose. It is necessary not only to apply a setting agent to a paper coated with a coating containing such an adhesive, but also to remove any excess setting agent by, for example, passing the coated paper through suitable squeeze rolls. Coatings containing hydroxyethyl cellulose as the binder which have not been set have very poor bonding strengths so as to be subject to "picking" when the coated paper is printed.

Now in accordance with the present invention there has been discovered a process for preparing a new coated paper using a new adhesive as a binder for the coating color, the binder being a cellulose sulfate. In carrying out the invention a dispersion of a coating pigment in an aqueous solution of cellulose sulfate is prepared. This coating color is applied to a fibrous cellulosic web by any suitable coating machine. The paper is then dried by any of the means known to the art. There results a coated paper having a coating which is firmly adherent to the paper base. The coating is composed of a film of contiguous pigment particles bound together by the cellulose sulfate.

Alternatively, after the coating color has been applied to the fibrous cellulosic web by the coating machine, the coated surface may then be immediately contacted with a setting agent which coagulates the adhesive in the coating to form a film of contiguous pigment particles bound together by the cellulose sulfate. The excess setting agent is squeezed out and the coated sheet is dried.

Another variation of this process, called the reverse coating process, comprises impregnating the cellulosic web with an aqueous solution of setting agent for the cellulose sulfate, preferably drying the impregnated paper, although this step is not absolutely necessary, covering a face of the paper with a continuous coating of pigment dispersed in an aqueous solution of cellulose sulfate, and finally drying the coated paper.

Whichever process is used, there results a coated paper of the type having a base of cellulosic fibers and a printing surface consisting essentially of a film of contiguous pigment particles interspersed in a binder by means of which the pigment is maintained on the base.

The coated papers prepared according to this invention without the use of a setting agent have coatings with pick resistances as great as coatings prepared using the prior art casein at twice the adhesive concentration. The coated papers prepared according to this invention without the use of a setting agent have pick resistance values about three times greater than those observed for coatings prepared using other cellulose derivatives as binders without the use of a setting agent. When used without a setting agent, coatings containing this new binder have sufficient bonding strength to permit the subsequent printing of the coated paper without picking. Moreover, coatings using a cellulose sulfate as an adhesive, either with or without a setting agent, have good printing properties and give glossy prints which dry rapidly. Coating compositions (sometimes referred to as "colors") may be prepared using this adhesive which have high solids content at low viscosities, thus making possible the application of the color to the paper at sufficiently high speeds to be economical in ordinary coating processes.

The following examples are presented in illustration but not in limitation of the invention. All parts and percentages are by weight unless otherwise specified.

Example 1

To 64.3 parts of a 7% aqueous solution of the sodium salt of a cellulose sulfate having a degree of substitution of 0.33 sulfate group per anhydroglucose unit was added 60 parts of clay in small portions with vigorous agitation. After the clay was added the stirring was continued until the color was smooth. Additional water was then added to the color to make up a total weight of 129 parts. This color contained 50% solids which consisted of 7.5 parts of sodium cellulose sulfate per 100 parts of clay. This color was applied to handsheets of Litho No. 5 raw stock at a coat weight of 11–13 lb. per ream (24 x 36/500) using a Martinson laboratory coater. The coated sheets were dried on an electric hot plate at 200° F. The coated paper resulting from the procedure of this example was characterized by excellent color, brightness and finish.

*Example 2*

A coating color was prepared as in Example 1 and was applied to handsheets of Litho No. 5 raw stock at a coat weight of 11–13 lb. per ream (24x36/500) using a Martinson laboratory coater. Immediately after application of the coating to the paper, the coated surfaces of the sheet were brought into contact with a solution of 20% magnesium chloride. The sheets were passed through squeeze rolls at a nip pressure of 20 lb. per linear inch and were dried on an electric hot plate at 200° F. The coated paper resulting from the procedure of this example was characterized by excellent color, brightness and finish.

*Example 3*

A coating color was prepared as in Example 1 and was applied to handsheets of Litho No. 5 raw stock at a coat weight of 11–13 lb. per ream (24x36/500) using a Martinson laboratory coater. The freshly coated sheets were then exposed to an atmosphere of ammonia vapor from boiling concentrated ammonium hydroxide for 10 to 15 minutes. The sheets were dried on an electric hot plate at 200° F. The coated paper resulting from the procedure of this example was characterized by excellent color, brightness and finish.

*Example 4*

A coating color was prepared as in Example 1 only the binder consisted of a hydroxyethyl cellulose having a degree of substitution of 1.14 hydroxyethyl groups per anhydroglucose unit. The color was applied to handsheets of Litho No. 5 raw stock as described in Example 1.

*Example 5*

A coating color was prepared as in Example 1 only the binder consisted of the sodium salt of a carboxymethylcellulose having a degree of substitution of 0.55 carboxymethyl group per anhydroglucose unit. The color was applied to handsheets of Litho No. 5 raw stock as described in Example 1.

*Example 6*

A coating color was prepared as in Example 1 only the binder consisted of the sodium salt of a sulfoethyl cellulose having a degree of substitution of 0.33 sulfoethyl group per anhydroglucose unit. The color was applied to handsheets of Litho No. 5 raw stock as described in Example 1.

*Example 7*

A coating color was prepared as in Example 1 only the binder consisted of the sodium salt of a carboxymethyl hydroxyethyl cellulose having a degree of substitution of 0.43 carboxymethyl and 0.41 hydroxyethyl groups per anhydroglucose unit. The color was applied to handsheets of Litho No. 5 raw stock as described in Example 1.

*Example 8*

A coating color was prepared using casein as the binder, the amount used per 100 parts of clay having been twice that of the previous examples. The exact procedure was as follows: To 220 parts of water warmed to 50° C. was added 45 parts of dry casein in small portions with vigorous agitation. To this mixture was added 2.25 parts of sodium hydroxide in 20 parts of water. After about 15 minutes, the casein was cut and the solution was made up to 300 parts with water. To 143 parts of a 70% clay slip were added 10 parts of water and 100 parts of the above casein solution. The color was made up to 255.5 parts with water. The percent solids in the color was 45% and the percent adhesive based on the weight of the clay was 15%. The color was applied to handsheets of Litho No. 5 raw stock as in Example 1. The pick resistance of the coatings laid down from these colors is compared in the following table:

| Example No. | Adhesive | Pick Resistance (Speed Ranger Units) |
|---|---|---|
| 1 | Sodium cellulose sulfate | 3.0 |
| 2 | ----do---- | 6.0 |
| 3 | ----do---- | 4.0 |
| 4 | Hydroxyethyl cellulose | <1 |
| 5 | Sodium carboxymethylcellulose | <1 |
| 6 | Sodium sulfoethyl cellulose | <1 |
| 7 | Sodium carboxymethyl hydroxyethyl cellulose | <1 |
| 8 | Casein | 2.5 |

The pick resistance referred to in the examples was obtained by means of a pick tester consisting of an inking roller, an impression cylinder, and a vacuum cylinder which also carries the sample being tested. The action simulates that of a rotary press, but the speed of the press can be varied by a speed ranger variable speed transmission. In practice the tack of the ink and all other controllable test conditions are standardized and the maximum speed is determined at which the paper can be printed without picking. The test is described in "The Hercules Print Tester" by E. J. Barber and J. W. Davis in Tappi, vol. 34, page 433 (October 1951). The higher the speed ranger number the greater is the pick resistance or the bonding strength of the adhesive.

The cellulose sulfate used in preparing the new coated papers in accordance with this invention are those which are water-soluble. By "water-soluble" is meant that the cellulose sulfate at a 5% by weight concentration is completely dispersible in water. The cellulose sulfates having these solubility characteristics will have a degree of substitution of at least about 0.20 sulfate group per anhydroglucose unit. As an upper limit, the cellulose sulfates which are operable in this invention will have a degree of substitution of no more than about 1.5 sulfate groups per anhydroglucose unit. Cellulose sulfates exceeding this upper degree of substitution would be so water soluble as to render coagulation difficult. The upper and lower limits on the degree of substitution may vary somewhat from the values given depending on the method of preparing the cellulose sulfate.

By the term "cellulose sulfate" as used throughout the specification and claims is meant the salts of the cellulose derivative which possess the requisite solubility characteristics specified above. Examples of the salts which are operable in this invention are the alkali metal salts such as the sodium and potassium salts, also the ammonium and the calcium salts of cellulose sulfate. Of these salts it is preferred to use a sodium cellulose sulfate and it is still further preferred to use such a salt having a degree of substitution of about 0.3 sulfate group per anhydroglucose unit.

The pigment material which is utilized in the coating color comprises one of the paper coating fillers, such as, for example, a pulverized clay or the like. For higher quality or special types of paper there may be substituted therefor other known pigment materials such as, for example, titanium dioxide, satin white or other coating pigments alone or preferably with a clay base. The modification of the coating color using these materials will be within the knowledge of those skilled in the art and it is to be understood that the pigment material contemplated herein includes any or all of these materials.

In preparing the coating colors it is the preferred procedure to first prepare an aqueous solution of the cellulose sulfate and then disperse the pigment therein as illustrated in Example 1. If desired, 3% or less of an alkali (NaOH for example), based on the solution, may be added to reduce the solution viscosity, thereby increasing the ease of handling. Alternatively, all of the ingredients may be admixed at the same time. Still another alternative is to prepare a pigment slip from water and the desired pigment and then admix this slip with an aqueous solution of cellulose sulfate.

The amount of the binder in the coating color is maintained between about 3% and 15% based on the weight of the pigment and preferably between 6% and 8%. In general the binder content will depend upon the grade and the end use of the paper being prepared.

For optimum results in the coating of paper it is preferred to prepare a coating color having a total solids composition which is relatively high, thus providing good surface coating quality and economic operation. A preferred range of total solids for the coating color is between about 30% and 65% solids with an optimum value at about 40% to 55%.

Any setting agent for cellulose sulfate may be employed in accordance with this invention. The ability of the setting agent to coagulate the cellulose sulfate is directly dependent upon the fundamental nature of its constituent ions and in particular about its affinity for water molecules. The ions of the setting agent are though to compete with the particles of the cellulose sulfate for the available water. The highly polar ions attract the dipolar water molecules more strongly than do the relatively nonpolar cellulose sulfate particles thereby dehydrating the cellulose sulfate causing it to coagulate. The efficacy of an ion in coagulating the cellulose sulfate is therefore attributed to its tendency to become hydrated. Among the setting agents which may be used to coagulate the cellulose sulfate are the water-soluble halides and nitrates of the alkali metals, the alkaline earth metals, magnesium and zinc; the mono- and di-alkali metal phosphates; ammonia vapor; etc. The preferred setting agents are mono- and di-sodium phosphate, magnesium chloride, calcium chloride, sodium chloride, and ammonia vapor. The setting agent is applied to the paper in the form of an aqueous solution, preferably of about 10% to about 30% concentration. Although the concentration of the solution is not critical, it must be high enough to coagulate the cellulose sulfate. In case the reverse coating process is used, a wetting agent may be incorporated in the aqueous solution to facilitate impregnation of the base stock.

Any suitable coating machine known to those skilled in the art may be used. The machine may be a shaft coater, a roll coater, a knife coater, an air brush coater or a gravure or letter press type.

The setting agent may be heated to 150° to 200° F. to speed up the reaction, but this step is not necessary.

The coated paper may be dried by any suitable means, but it is preferred to dry the paper in contact with a drum drier or a series of paper machine drier rolls. This drying under tension minimizes cockle from shrinkage.

Papers prepared from the colors of this invention have good printing properties and give glossy prints which dry rapidly. The coatings laid down from the colors have an exceptionally high pick resistance evidencing exceptionally good bonding between the coating and the paper base. This is true even in the case of coatings which have not been coagulated with a setting agent. The colors of this invention give high solids at low viscosity so that they may be applied to paper at sufficiently high speeds to be economical in ordinary coating processes.

What I claim and desire to protect by Letters Patent is:

1. The process for preparing a coated paper comprising applying to the surface of a web of cellulose fibers a coating color comprising essentially a pigment dispersed in an aqueous solution of adhesive, said coating color having from about 30% to about 65% total solids and having said adhesive present in the amount of between about 5% and about 15% based on the weight of the pigment, said adhesive consisting of a water-soluble salt of cellulose sulfate having from about 0.2 to about 1.5 sulfate groups per anhydroglucose unit and selected from the group consisting of the alkali metal, ammonium and calcium salts, and after application of said coating color coagulating said cellulose sulfate salt by contacting the resulting coating with a water solution of magnesium chloride, and drying the paper.

2. The process for preparing a coated paper comprising applying to the surface of a web of cellulosic fibers a coating color comprising essentially a pigment dispersed in an aqueous solution of adhesive, said coating color having from about 30% to about 65% total solids and having said adhesive present in the amount of between about 5% and 15% based on the weight of the pigment, said adhesive consisting of a water-soluble salt of cellulose sulfate having from about 0.2 to about 1.5 sulfate groups per anhydroglucose unit and selected from the group consisting of the alkali metal, ammonium and calcium salts, and after application of said coating color coagulating said cellulose sulfate salt by contacting the resulting coating with a water solution of monosodium phosphate, and drying the paper.

3. The process for preparing a coated paper comprising applying to the surface of a web of cellulosic fibers a coating color comprising essentially a pigment dispersed in an aqueous solution of adhesive, said coating color having from about 30% to about 65% total solids and having said adhesive present in the amount of between about 5% and about 15% based on the weight of the pigment, said adhesive consisting of a water-soluble salt of cellulose sulfate having from about 0.2 to about 1.5 sulfate groups per anhydroglucose unit and selected from the group consisting of the alkali metal, ammonium and calcium salts, and after application of said coating color coagulating said cellulose sulfate salt by contacting the resulting coating with a water solution of calcium chloride, and drying the paper.

4. The process for preparing a coated paper comprising applying to the surface of a web of cellulosic fibers a coating color comprising essentially a pigment dispersed in an aqueous solution of adhesive, said coating color having from about 30% to about 65% total solids and having said adhesive present in the amount of between about 5% and about 15% based on the weight of the pigment, said adhesive consisting of a water-soluble salt of cellulose sulfate having from about 0.2 to about 1.5 sulfate groups per anhydroglucose unit and selected from the group consisting of the alkali metal, ammonium and calcium salts, and after application of said coating color coagulating said cellulose sulfate salt by contacting the resulting coating with a water solution of sodium chloride, and drying the paper.

5. The process for preparing a coated paper comprising applying to the surface of a web of cellulosic fibers a coating color comprising essentially a pigment dispersed in an aqueous solution of adhesive, said coating color having from about 30% to about 65% total solids and having said adhesive present in the amount of between about 5% and about 15% based on the weight of the pigment, said adhesive consisting of a water-soluble salt of cellulose sulfate having from about 0.2 to about 1.5 sulfate groups per anhydroglucose unit and selected from the group consisting of the alkali metal, ammonium and calcium salts, and after application of said coating coagulating said cellulose sulfate salt by contacting the resulting coating with ammonia vapor, and drying the paper.

6. The process for preparing a coated paper comprising applying to the surface of a web of cellulose fibers a coating color comprising essentially a pigment dispersed in an aqueous solution of adhesive, said coating color having from about 30% to about 65% total solids and having said adhesive present in the amount of between about 5% and about 15% based on the weight of the pigment, said adhesive consisting of a water-soluble salt of cellulose sulfate having from about 0.2 to about 1.5 sulfate groups per anhydroglucose unit and selected from the group consisting of the alkali metal, ammonium and calcium salts, and after application of said coating color coagulating said cellulose sulfate salt by contacting the resulting coating with a water solution of a coagulating agent selected from the group consisting of the mono- and di-alkali metal phosphates, the water-soluble halides and nitrates of the alkali metals, the alkaline earth metals, magnesium and zinc, and ammonia vapor.

7. In the process for preparing a coated paper of the type having a base of cellulosic fibers and a printing surface consisting essentially of a film of contiguous pigment particles interspersed in adhesive by means of which the pigment is retained on the base comprising applying to the surface of a web of cellulosic fibers a coating color consisting essentially of a pigment dispersed in aqueous solution of a water-soluble salt of cellulose sulfate having from about 0.2 to about 1.5 sulfate groups per anhydroglucose unit and selected from the group consisting of the alkali metal, ammonium and calcium salts, as the adhesive, said coating color having from about 30% to about 65% total solids and having said adhesive present in the amount of between about 5% and about 15% based on the weight of the pigment, and drying the paper, the improvement which comprises coagulating said water-soluble salt of cellulose sulfate before drying the paper by contacting said coating color with a setting agent selected from the group consisting of the mono- and di-alkali metal phosphates, the water-soluble halides and nitrates of the alkali metals, the alkaline earth metals, magnesium, and zinc, and ammonia vapor.

References Cited in the file of this patent

UNITED STATES PATENTS

| | | |
|---|---|---|
| 2,106,709 | Baker | Feb. 1, 1938 |
| 2,395,992 | Clark | Mar. 5, 1946 |
| 2,502,783 | Erickson | Apr. 4, 1950 |
| 2,559,914 | Frank | July 10, 1951 |
| 2,640,790 | Barber | June 2, 1953 |
| 2,655,864 | Newman | Oct. 20, 1953 |

FOREIGN PATENTS

| | | |
|---|---|---|
| 856,012 | France | May 25, 1940 |

OTHER REFERENCES

Tennessee Eastman Corporation, "Sodium Cellulose Sulfate," 1950, 5 pgs.